Patented Oct. 20, 1936

2,057,685

UNITED STATES PATENT OFFICE 2,057,685

AZO DYESTUFFS AND THEIR PRODUCTION

Arthur Howard Knight, Blackley, Manchester, England, assignor to Imperial Chemical Industries Limited, a corporation of Great Britain No Drawing. Application November 30, 1934, Serial No. 755,511. In Great Britain December 4, 1933

10 Claims. (Cl. 260—96)

The invention relates to the manufacture of new water-soluble mono-azo dyestuffs which dye acetate artificial silk, natural silk, tin-weighted silk, wool and leather in fast violet to blue tints.

The invention consists in coupling a diazotised 6-halogeno-2,4-dinitroaniline, e. g. 6-chloro- or 6-bromo-2,4-dinitrodiazobenzene with an N-sulphatoethyl- or an N-alkyl-N-sulphatoethyl derivative of an amine of the benzene series which is adapted to couple in the para position to the amino group. The alkyl may be methyl, ethyl, propyl or butyl or a higher alkyl.

The new mono-azo dyestuffs are applied in the dyeing of acetate artificial silk, natural silk, tin-weighted silk, wool and leather.

In United States specification No. 1,483,084 there is described the manufacture of azo dyestuffs which dye wool and silk from an acid bath and which owe their solubility in water and their acid character to the presence in their structure of the alcoholic sulphuric group —$C_2H_4SO_4H$ attached to nitrogen. Dyes containing this —$C_2H_4SO_4H$ group (including water-soluble salts thereof) have been called "sulphato" dyestuffs. Further, in British specification No. 237,739 there is described a process of dyeing acetate artificial silk by applying certain of these sulphato mono-azo dyestuffs, and in particular sulphato nitrated monoazo dyestuffs, some of which yield violet to blue shades, in a neutral, acid or alkaline dyebath.

Not only are the dyestuffs of the present invention characterized by their greater fastness to light than those of similar shade which are described in the above mentioned specification, but the presence of the halogen in the 6-position of the diazo component causes a marked and unforeseen displacement of shade towards the blue end of the spectrum as compared with the dyestuffs from the same coupling components and e. g. diazotized 2,4-dinitroaniline or 6-methyl-2,4-dinitroaniline. The present invention therefore leads more readily to the manufacture of water-soluble dyestuffs having red-violet to blue shades and having very good affinity for acetate artificial silk when applied from an acid, neutral or alkaline bath.

The dyestuffs of the present invention have very good solubility in hot water, good fastness properties and are dischargeable. They are eminently suitable for the printing of acetate artificial silk. Moreover, they are valuable for the dyeing of wool, natural silk, tin-weighted silk and leather.

The invention is illustrated but not limited by the following examples in which the parts are by weight.

Example 1

69 parts of sodium nitrite are added to 1480 parts of 100% sulphuric acid and stirred until no solid remains, then 222 parts of 6-chloro-2,4-dinitroaniline are added, with stirring, during two hours. The resulting liquid may be heated to 50° C. in order to complete the diazotization. It is then cooled to 20° C. and added slowly with stirring to an ice-cold solution of 317 parts of 3-N-n-butyl-N-sulphato-ethylamino-4-methoxy toluene in 4000 parts of water containing 40 parts of caustic soda to which 136 parts of sodium acetate have been added. During the addition of the sulphuric acid solution ice is added from time to time to keep the temperature of the aqueous medium at 0° C. and 40% aqueous caustic soda is added gradually at such a rate that the coupling medium is at no time during coupling acid to Congo red paper and never more than faintly alkaline to Clayton yellow paper.

When all the sulphuric acid solution has been added the dyestuff suspension is made alkaline with caustic soda solution and the dyestuff filtered off, washed with water, and preserved as paste or dried in any suitable way. It is soluble in hot water and dyes acetate artificial silk from a neutral dye-bath containing 3% salt giving navy blue shades of good fastness properties and good dischargeability. It can also be applied for the direct printing of acetate artificial silk.

The dyestuff, when applied from an acid bath, possesses good affinity for wool, natural silk, tin-weighted silk, and leather, dyeing these materials in navy blue shades.

3 - N - n - butyl-N-sulphatoethylamino - 4 - methoxytoluene is obtained as a solution of its sodium salt in water by treating 3-N-n-butyl-N-$\beta$-hydroxyethylamino-4-methoxytoluene dissolved in tetrachloroethane with chlorosulphonic acid, removing the solvent by distillation, dissolving the crude sulphato compound remaining as a viscous oil in dilute caustic soda solution, and extracting the solution of the sodium salt of the sulphato compound so obtained with ether to remove any unchanged 3-N-n-butyl-N-$\beta$-hydroxyethylamino-4-methoxytoluene.

If in the above example, instead of the 3-N-n-butyl-N-sulphatoethylamino- 4 - methoxytoluene there are used 303 parts of 3-N-isopropyl-N-sulphatoethylamino-4-methoxytoluene (prepared in a similar manner to that described above for the preparation of 3-N-n-butyl-N-sulphatoethyl-amino-4-methoxy-toluene) the resulting dyestuff gives redder shades of navy blue.

Example 2

69 parts of sodium nitrite are added to 1480 parts of 100% sulphuric acid and stirred until no solid remains, then 267 parts of 6-bromo-2,4-dinitroaniline are added to this with stirring during two hours and stirring continued for a short time longer if necessary, until no solid matter remains. The resulting liquid is added slowly with good agitation to a cooled solution containing 231 parts of 3-N-sulphatoethylamino-toluene in 4000 parts of water and 40 parts of caustic soda to which 136 parts of sodium acetate have been added. Ice is added from time to time during coupling to keep the temperature of the aqueous medium at 0-5° C. and 40% aqueous caustic soda is gradually added at such a rate that coupling medium is at no time during coupling acid to Congo red paper and never more than faintly alkaline to Clayton yellow paper.

When all the sulphuric acid solution has been added the dyestuff suspension is rendered alkaline with caustic soda, heated to 80° C., salted with 10% salt, and the dyestuff filtered off, washed with 10% brine, and preserved as paste or dried in any suitable way.

It is soluble in hot water and dyes acetate artificial silk in reddish violet shades from a neutral or alkaline dyebath.

Similar shades are given by the dyestuff obtained by using 222 parts of 6-chloro-2,4-dinitroaniline instead of 267 parts of 6-bromo-2,4-dinitroanline in the above example.

3-N-sulphatoethylaminotoluene is prepared from 3-N-β-hydroxyethylaminotoluene by the method employed for the preparation of sulphatoethylaniline described by Saunders in the Journal of the Chemical Society, vol. 121, page 2671. It has a melting point of 182° C.

The invention is further illustrated by the examples listed in the following table:—

| Example | Diazo compound from | Coupled with | Shade on acetate artificial silk |
|---|---|---|---|
| 3 | 6-bromo-2,4-dinitroaniline | 3-N-sulphatoethylamino-4-methoxy toluene | Violet |
| 4 | do | 3-N-n-butyl-N-sulphatoethyl-amino-4-methoxy toluene | Reddish blue |
| 5 | do | N-methyl-N-sulphatoethyl-aniline | Reddish violet |
| 6 | 6-chloro-2,4-dinitroaniline | N-ethylsulphato-ethylaniline | Reddish violet |
| 7 | do | 3-N-isobutyl-N-sulphatoethylamino-4-methoxytoluene | Navy blue |
| 8 | do | N-n-butyl-N-sulphatoethyl-2,5-dimethoxyaniline | Blue |

3 - N - isobutyl - N - sulphatoethylamino - 4 - methoxytoluene is obtained from 3-amino-4-methoxytoluene by first reacting it with isobutylbromide, condensing the resulting compound with ethylene chlorhydrin in presence of chalk and sulphating the so-obtained 3-N-isobutyl-β-hydroxyethylamino-4-methoxytoluene (B. P. 165°–169° C./13 m. m.) by means of chlorsulphonic acid in tetrachlorethane solution.

N - n - Butyl - N - sulphatoethyl - 2,5 - dimethoxyaniline is obtained by first reacting 2,5-dimethoxyaniline with ethylene chlorhydrin in presence of chalk, reacting the resulting compound with n-butylbromide under pressure and sulphating the N-n-butyl-N-β-hydroxyethyl-2,5-dimethoxyaniline so obtained (B. P. 190–196° C./7 m. m.) with chlorsulphonic acid.

I claim:

1. Process for the manufacture of azo dyes which comprises coupling a diazotized 6-halogeno-2,4-dinitroaniline with a para-coupling monoamine of the benezene series in which the amino group carries as substituent the group:

$$-\underset{H}{\overset{H}{C}}-\underset{H}{\overset{H}{C}}-O-\underset{O}{\overset{O}{S}}-O-H$$

2. Process for the manufacture of azo dyes which comprises coupling a diazotized 6-chloro-2,4-dinitroaniline with a para-coupling monoamine of the benzene series in which the amino group carries as substituent the group:

$$-\underset{H}{\overset{H}{C}}-\underset{H}{\overset{H}{C}}-O-\underset{O}{\overset{O}{S}}-O-H$$

3. Process for the manufacture of azo dyes which comprises coupling a diazotized 6-bromo-2,4-dinitroaniline with a para-coupling monoamine of the benzene series in which the amino group carries as substituent the group:

$$-\underset{H}{\overset{H}{C}}-\underset{H}{\overset{H}{C}}-O-\underset{O}{\overset{O}{S}}-O-H$$

4. Process for the manufacture of azo dyes which comprises coupling a diazotized 6-halogeno-2,4-dinitroaniline with a compound of the formula $$\text{C}_6\text{H}_5-\underset{R}{N}-\underset{H}{\overset{H}{C}}-\underset{H}{\overset{H}{C}}-O-\underset{O}{\overset{O}{S}}-O-H$$

where R stands for hydrogen or alkyl.

5. Process for the manufacture of azo dyes which comprises coupling a diazotized 6-halogeno-2,4-dinitroaniline with a compound of the formula $$\text{C}_6\text{H}_5-\underset{R}{N}-\underset{H}{\overset{H}{C}}-\underset{H}{\overset{H}{C}}-O-\underset{O}{\overset{O}{S}}-O-H$$

where R stands for an alkyl group having less than 5 carbon atoms.

6. Process for the manufacture of azo dyes which comprises coupling a diazotized 6-halogeno-2,4-dinitroaniline with a compound of the formula (2,5-dimethoxyphenyl)$-\underset{R}{N}-\underset{H}{\overset{H}{C}}-\underset{H}{\overset{H}{C}}-O-\underset{O}{\overset{O}{S}}-O-H$ where R stands for hydrogen or an alkyl group having less than 5 carbon atoms.

7. Process as claimed in claim 6 in which the diazo component is diazotized 6-chloro-2,4-dinitroaniline.

8. Process as claimed in claim 6 in which the diazo component is diazotized 6-bromo-2,4-dinitroaniline.

9. A compound represented by the formula:

[Structure: 2,4-dinitro-6-halogeno-phenyl−N=N−phenyl−N(alkyl)(sulphatoethyl)]

10. A dyestuff having the formula

[Structure: 2,4-dinitro-6-X-phenyl−N=N−phenyl−N(R)−CH$_2$−CH$_2$−O−SO$_3$H]

where X stands for chlorine or bromine, R for hydrogen or an alkyl group of less than 5 carbon atoms.

ARTHUR HOWARD KNIGHT.